United States Patent [19]
Johnson

[11] 4,041,441
[45] Aug. 9, 1977

[54] DIVER'S PULSE STRETCH SONAR

[75] Inventor: Clarence S. Johnson, San Diego, Calif.

[73] Assignee: The United States of America as represented by the Secretary of the Navy, Washington, D.C.

[21] Appl. No.: 714,436

[22] Filed: Aug. 13, 1976

[51] Int. Cl.² .......................... G01S 9/66; G01S 7/54
[52] U.S. Cl. .................................... 340/3 R; 340/3 C
[58] Field of Search ............. 340/3 C, 3 R, 6 M, 5 T

[56] References Cited
U.S. PATENT DOCUMENTS 3,789,353  1/1974  Hunter et al. ....................... 340/5 T
3,887,896  6/1975  Ramstedt ............................ 340/3 R Primary Examiner—Richard A. Farley
Attorney, Agent, or Firm—Richard S. Sciascia; Ervin F. Johnston; Thomas Glenn Keough

[57] ABSTRACT

Diver carried transducers and electronic instrumentation are provided which will enable a diver to approximate the directional and discriminatory resolution of marine mammals. An ensonifying signal above the audio spectrum is projected and echo signals are digitized. Next, they are transformed to within the audio spectrum to be capable of being resolved by a diver. Consequently, the location, shape and composition of objects may be discerned without visual verification.

8 Claims, 2 Drawing Figures

DIVER'S PULSE STRETCH SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A wide variety of sonar systems have been in evolving developmental stages for years. Some are more particularly adaptable for submersibles and others for surface going vessels. The resolution and the images presented to an operator permit the undersea location of larger objects. Miniaturization of some undersea sonars has tended to adversely affect resolution. In an effort to achieve more acceptable operational characteristics, systems have projected and received higher frequencies to produce more detailed acoustic images of smaller objects. Unfortunately, these transducer and hydrophone combinations, while giving a somewhat more acceptable degree of resolution, are far too burdensome and complicated for a free-swimming diver working under covert conditions. Synthesizers and multiplexing techniques have been tried, yet they fall short of the acoustic resolution of porpoises and dolphins. The broadband signals which contain higher frequency components are radiated by these marine mammals to enable them to catch prey and to avoid underwater obstacles under zero visibility conditions. Thus, there is a continuing need for a diver carried device utilizing the high frequency picturing capability of marine mammals to provide a higher degree of resolution under adverse conditions of visibility.

SUMMARY OF THE INVENTION

A projector and a pair of spaced apart receivers of high frequency acoustic energy are coupled to feed echo signals to a pair of head phones. The echo signals are digitized and transformed to within the audio spectrum. Now a diver need only monitor the response to identify targets.

An object of the invention is to provide a sonar target discriminator.

Another object of the invention is to provide a sonar processor having size, shape, and location resolution.

Still another object of the invention is to provide a device sized to be carried by a diver to discriminate underwater targets.

Yet another object of this invention is to provide a compact, portable, underwater, sonar system capable of being operated by a diver under zero conditions.

Still another object is to provide a sonar target discrimination apparatus which employs high frequency, broadband, projected signals and echo signals in the marine mammal range to provide improved resolution.

A further object is to provide a diver resolution device which translates broadband, high frequency projections and echoes into the audio spectrum.

These and other objects of the invention will be more thoroughly understood from the drawings when taken with the ensuing description.

DESCRIPTION OF THE PREFERRED EMBODIMENT

Figure 1:
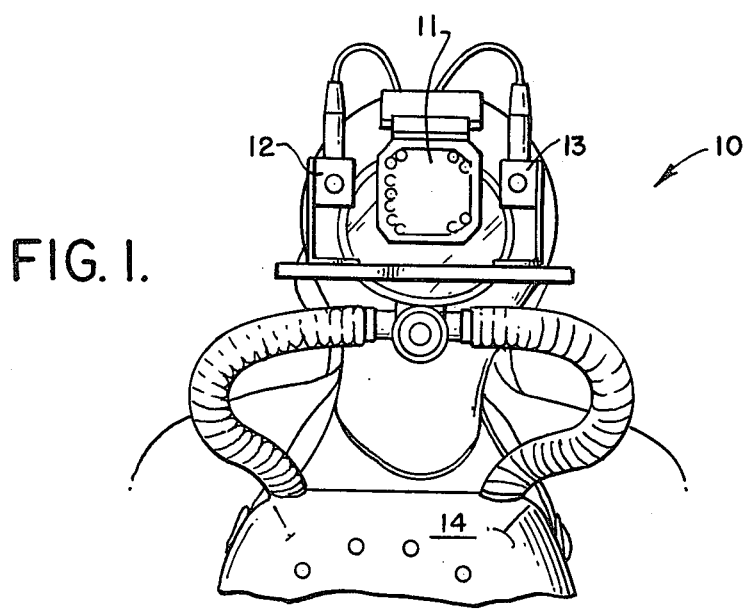
FIG. 1 is an isometric depiction of the invention.
Figure 2:
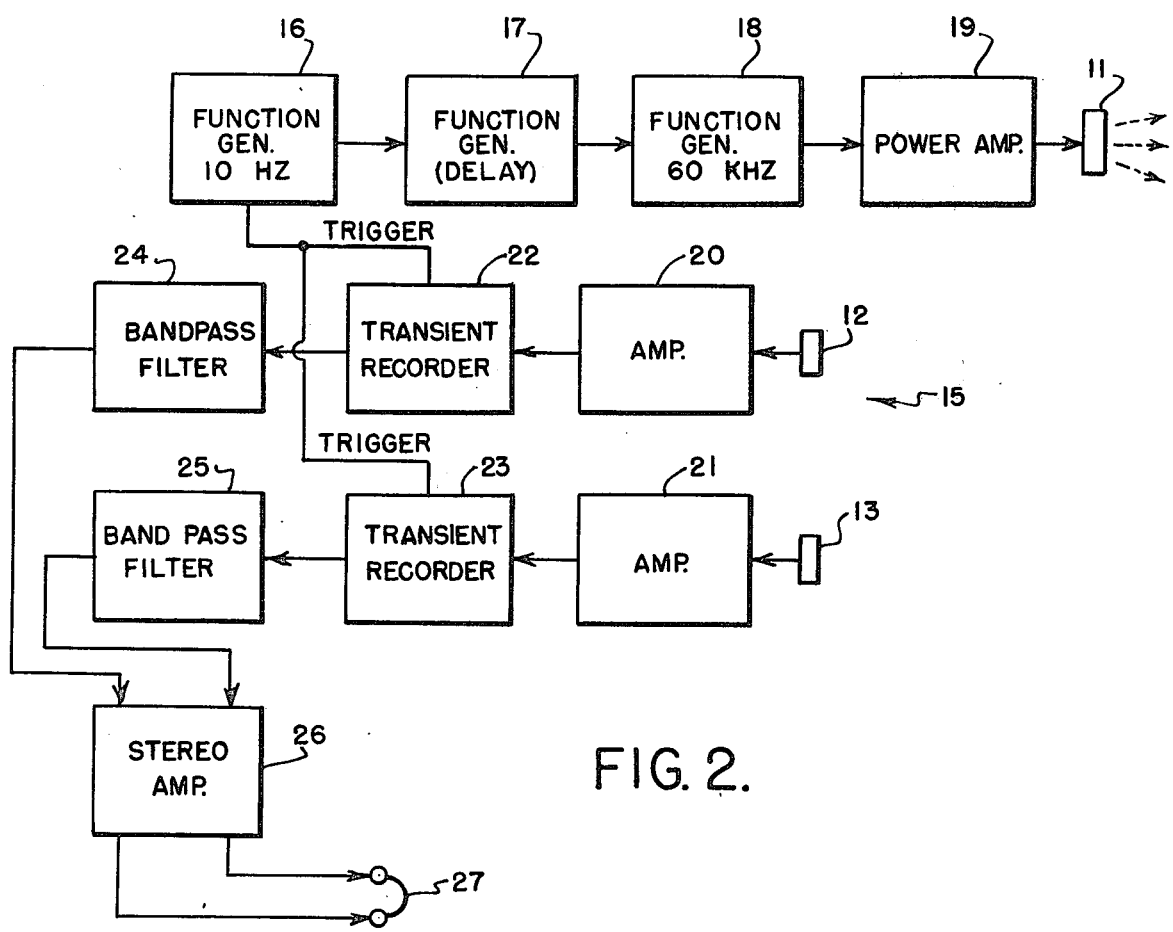
FIG. 2 is a block diagram of the invention.

Referring now to FIG. 1 of the drawings, a diving headgear 10 serves as a mounting platform for three transducers of acoustic energy. A centrally disposed, acoustic energy projector 11 ensonifies the surrounding water and a pair of acoustic energy receivers or hydrophones 12 and 13 flank the projector. Separation of the receivers about 11½ centimeters provided acceptable resolution among a variety of targets.

Because the transducers rely on the transmission and reception of acoustic energy for location or navigation, ambient noise should be held to a minimum. A closed circuit, underwater breathing system 14, such as an oxygen-rebreathing system, enhances the responsiveness of the system since it reduces the problems otherwise associated with bubble noise.

The projector of acoustic energy projects a single cycle of 60 kHz into the water at rates determined by interconnected electronic circuitry discussed below. A projector transducer of the type developed by the Applied Research Laboratory, University of Texas, Type 3021 functions very satisfactorily for its intended purpose. The 60 kHz pulse has demonstrated a capability for an acceptable level of discrimination. But, due to its relatively high frequency and bandwidth (60 kHz), above the audio spectrum, reflected echoes cannot be utilized by a diver without additional signal processing.

Two hydrophones 12 and 13 receive echoes of the projected 60 kHz pulses and feed representative potentials to an electronics package 15 for further processing. The two hydrophones having an acceptable response were developed by the Naval Research Laboratory, Underwater Sound Reference Division, Orlando, Fla., Type E-27. Their separation referred to above permitted the discrimination of differently shaped "echo lobes" from differently shaped targets.

The sequence when the 60 kHz pulse is transmitted and the processing of the echoes begins, is governed by a function generator 16 which provides appropriate trigger pulses. A suitable generator is a Model 406 marketed by the Wavetek Corporation, 9045 Balboa Avenue, San Diego, Calif. It feeds 10 Hz trigger pulses to a function generator 17. This generator, a Model 3300A, marketed by the Hewlett Packard Corporation of Palo Alto, Calf., delays the 10 Hz trigger pulses and initiates a single cycle 60 kHz signal in an interconnected function generator 18.

Generator 18 is a typical commercially available unit marketed by the Data Royal Corporation. While only a single complete cycle of the 60 kHz ensonifying signal is to be projected, slightly more than a single cycle was radiated due to the characteristics of projector transducer 11 after amplification in power amplifier 19, a Model 467A, Hewlett Packard amplifier.

Target echoes received by hydrophones 12 and 13 are fed to interconnected amplifiers 20 and 21. The amplified signals are passed to transient recorders 22 and 23 which digitize and store the amplified echoes.

The transient recorders successfully used were Model 802 transient recorders marketed by the Biomation Corporation of 1070 East Meadow Circle, Palo Alto, Calif. These recorders have the capability, when triggered by the function generator 16, to effect the digitizing and storage of the echo signals.

In the present embodiment, the signals were replayed at a rate 128 times slower than the frequency of transmission of the projected signal cycle of ensonifying energy. The factor of 128 is chosen so that the shortest echoes (about 20 microseconds) are stretched in time to at least 2 milliseconds in duration, the minimum duration required for humans to discriminate between the complex reflected transients.

Because the stretched echo signals are monitored by the driver wearing the headgear before the next ensonifying signal is emitted, the repetition rate of the ensonifying signal is limited to fifteen point six pulses per second. This rate also is governed by the time required to digitize the signals.

The digitized signals pass through a pair of bandpass filters 24 and 25. The filtered signals are smoothed out and are fed to a stereo amplifier 26 which drives a headset 27 worn by the diver.

With the projector and receiving transducers aforedescribed, a mean width of the projected signal is approximately 10° at 60 kHz. Side-to-side motion by the diver as the head is swung from side to side effected a scanning of the targets with different characteristic lobes being reflected from different targets.

Two sets of targets were used to emperically prove the effectiveness of the transducers and their associated electronics. Thirty centimeter diametered metallic plates either aluminum, copper, or brass, were stamped having different thicknesses and geometrical shapes (square, triangular or circular). Some of the targets had two-tenths of a centimeter thickness covered with neoprene foam material about sixty-three hundreths of a centimeter thick.

Changing the ensonifying frequency from 60 kHz to 75 kHz resulted in a slightly better target discrimination. Square, triangular, or circular targets all exhibited similar echo returns when ensonified head-on, that is, with the diver facing the target directly. The easiest way to discriminate between the differently shaped configurations of the target was to monitor the lobe differentiations between the echoes as a diver moves his head from side to side, the angular variations with respect to the line of the returning echoes were representative of the different targets.

Interestingly enough, when several divers were later given audiograms after discriminating among several targets, those divers having the best hearing were the best at discriminating between different targets and those having the poorest hearing did the worst, although all divers scored well.

Continuing development of the inventive concept will further demonstrate that the higher frequency broadband sonar pulses used by marine mammals result in improved resolution when shifted to the audio spectrum for real-time analysis by divers. Improvements will enable location of objects and navigation under conditions of zero visibility such as those encountered in murky water or in the dark.

Obviously, many modifications and variations of the present invention are possible in the light of the above teachings, and, it is therefore understood that within the scope of the disclosed inventive concept the invention may be practiced otherwise than as specifically described.

What is claimed is:

1. An apparatus for discriminating underwater targets by a diver comprising:
    means carried on headgear worn by the diver for projecting spaced repetitions of single cycles of ensonifying signals above the audio spectrum to the targets;
    means mounted on the headgear at opposite lateral extremes of the means for receiving echo signals of the ensonifying signals;
    means coupled to the receiving means for digitizing the echo signals and for replaying the echo signals within the audio range; and
    means coupled to the digitizing and replaying means for providing stored echo signals to within the audio spectrum indicative of underwater targets.

2. An apparatus according to claim 1 further including:
    means interposed between the digitizing and replaying means and the providing means for filtering the stored echo signals in the audio spectrum.

3. An apparatus according to claim 2 further including:
    means interposed between the receiving means and the digitizing and storing means for amplifying the echo signals of the ensonifying signals.

4. An apparatus according to claim 3 in which the receiving means is a pair of hydrophones each mounted on an opposite lateral extreme of the projecting means.

5. An apparatus according to claim 4 in which the digitizing and storing means is a pair of transient recorders each coupled to a separate hydrophone.

6. An apparatus according to claim 5 further including:
    means coupled to the projecting means for generating the ensonifying signals above the audio spectrum.

7. An apparatus according to claim 6 further including:
    means coupled to the generating means for initiating the ensonifying signals above the audio spectrum by the generating means.

8. An apparatus according to claim 7 in which the initiating means is coupled to both of the transient recorders for digitizing and storing the echo signals to within the audio spectrum.

* * * * *